E. MITCHELL.
GRAPPLE.
APPLICATION FILED JULY 19, 1911.
1,015,057.
Patented Jan. 16, 1912.
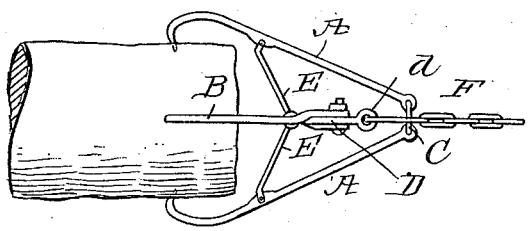
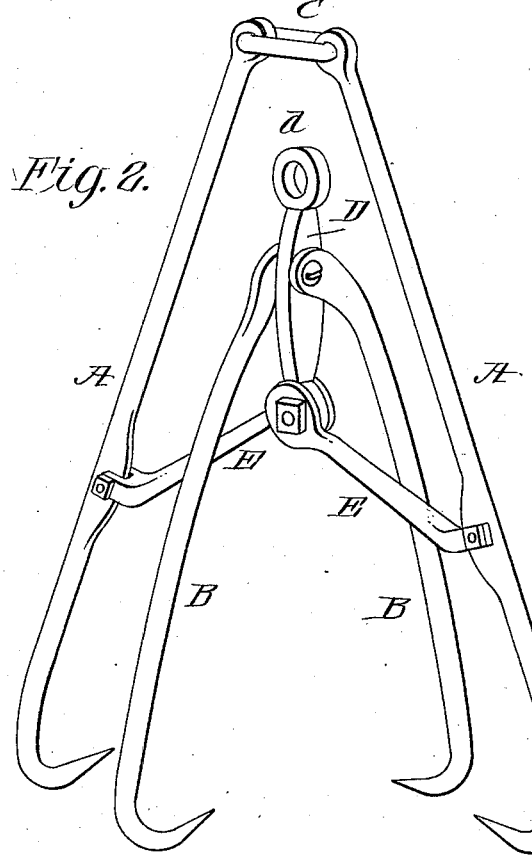
WITNESSES
Samuel E. Wade.
Amos W. Hart
INVENTOR
EDMUND MITCHELL.
BY
ATTORNEYS

UNITED STATES PATENT OFFICE.

EDMUND MITCHELL, OF OLD TRAP, NORTH CAROLINA.

GRAPPLE.

1,015,057.  Specification of Letters Patent.  Patented Jan. 16, 1912.

Application filed July 19, 1911. Serial No. 639,322.

*To all whom it may concern:*

Be it known that I, EDMUND MITCHELL, a citizen of the United States, and a resident of Old Trap, in the county of Camden and State of North Carolina, have invented an Improvement in Grapples, of which the following is a specification.

My invention is adapted for gripping and hauling or hoisting heavy articles, and particularly for use in logging or for hauling logs endwise to the mill or to any point where it is desired to collect them. It is composed of two sets of hook-shaped grippers or jaws so connected that tension on the rope or cable connected with one set of the jaws operates to simultaneously close the others, the greater the tension the firmer being the grip.

The details of construction, arrangement, and operation of the device are as hereinafter described, and illustrated in the accompanying drawing, in which—

Figure 1 is a plan view showing the grapple or tongs applied to the end of a log. Fig. 2 is an enlarged perspective view of the grapple.

The outer and longer jaws are indicated by A, and the shorter and inner jaws by B. All the jaws are formed with hooks at their free ends, the same projecting inward. The outer ends of the shanks of the outer jaws A are loosely connected by a link C. The shorter jaws B are pivoted to the body of a coupling or pull-piece D, the arrangement being such that the hooks B are arranged and operate in a plane which is at right angles to the plane of the outer or larger hooks A. The lower end of the head or coupling D is pivotally connected by links E with the middle portions or shanks of the outer hooks A, and the upper end of said head is constructed with a ring *d* for attachment of a rope or chain F, as shown in Fig. 1.

In practical operation, the device is applied as shown in Fig. 1; that is to say, the four hooks A, B, are spread apart and slid over or upon the end of the log, and then, upon applying tension to the cable, the pull thereby exerted on the head D has the obvious effect of drawing the outer hooks A inward, through the medium of the links E, the greater the tension the deeper being the penetration of the hooks of jaws A and consequently the firmer their attachment to the log. The hooks of the inner jaws B may be set in the log, and, when traction is applied, they also tend to close more firmly so that, in a general way, the effect is practically the same as in the case of the outer jaws A. In brief, therefore, by my improved construction I form a double hook or two sets of hooks which are so connected as to operate practically as one.

It will be seen that by the construction, arrangement, and connection of the several hook-shaped jaws, they serve practically as fenders and shoes upon which the log is supported more or less while being hauled over the ground, and thus the log is not liable to be hung up while being dragged out of the woods in consequence of hitting an obstruction such as a root or stone.

What I claim is:—

1. The improved grapple, comprising two sets of jaws, the members of each set being arranged opposite each other and one set within the other at right angles thereto, the shanks of the outer jaws being pivotally connected at the top, a head or pull-piece to which the inner jaws are pivoted, and links that pivotally connect said pull-piece with the outer jaws, substantially as described.

2. The improved grapple, comprising two sets of jaws, the members of each being arranged with their points projecting inward and one set of jaws within the other but at right angles thereto, a pull-piece to whose body the inner and shorter jaws are pivoted, and links pivotally connecting the lower end of the pull-piece with the jaws, the head being adapted for attachment of a cable, substantially as described.

EDMUND MITCHELL.

Witnesses:
C. B. EHRINGHAUS,
J. KENYON WILSON.

Copies of this patent may be obtained for five cents each, by addressing the "Commissioner of Patents, Washington, D. C."